(12) United States Patent
Hong

(10) Patent No.: US 11,968,721 B2
(45) Date of Patent: Apr. 23, 2024

(54) METHOD AND APPARATUS FOR TRANSMITTING RANDOM ACCESS INDICATION INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 442 days.

(21) Appl. No.: 17/290,179

(22) PCT Filed: Oct. 31, 2018

(86) PCT No.: PCT/CN2018/113154
§ 371 (c)(1),
(2) Date: Apr. 29, 2021

(87) PCT Pub. No.: WO2020/087379
PCT Pub. Date: May 7, 2020

(65) Prior Publication Data
US 2021/0392690 A1    Dec. 16, 2021

(51) Int. Cl.
*H04W 74/0833*    (2024.01)
*H04W 74/00*    (2009.01)

(52) U.S. Cl.
CPC ..... *H04W 74/0833* (2013.01); *H04W 74/002* (2013.01)

(58) Field of Classification Search
None
See application file for complete search history.

(56) References Cited

U.S. PATENT DOCUMENTS

| | | |
|---|---|---|
| 11,051,233 B2 | 6/2021 | Futaki et al. |
| 2016/0345325 A1 | 11/2016 | Liu et al. |
| 2018/0279186 A1* | 9/2018 | Park .............. H04W 36/30 |
| 2019/0349838 A1* | 11/2019 | Futaki ............ H04W 36/08 |
| 2021/0274428 A1 | 9/2021 | Futaki et al. |

FOREIGN PATENT DOCUMENTS

| | | |
|---|---|---|
| CN | 107734667 A | 2/2018 |
| CN | 108271214 A | 7/2018 |
| CN | 108271275 A | 7/2018 |
| CN | 108282816 A | 7/2018 |
| CN | 108282901 A | 7/2018 |

(Continued)

OTHER PUBLICATIONS

Third Office Action of the Chinese Application No. 201880002540.X, dated May 7, 2022 with English translation, (12p).

(Continued)

*Primary Examiner* — Minh Trang T Nguyen
(74) *Attorney, Agent, or Firm* — Arch & Lake LLP

(57) ABSTRACT

Provided are a method and apparatus for transmitting random access indication information. The method includes that: indication information about random access is generated, the indication information indicating that 2-step contention-based random access is supported or 4-step contention-based random access is supported; and a system message is broadcast to User Equipment (UE), the system message including the indication information.

15 Claims, 7 Drawing Sheets

(56) References Cited

FOREIGN PATENT DOCUMENTS

| CN | 108521889 A | 9/2018 |
|---|---|---|
| EP | 3101984 A1 | 12/2016 |
| WO | 2018075534 A1 | 4/2018 |
| WO | 2018127244 A1 | 7/2018 |
| WO | 2018128020 A1 | 7/2018 |

OTHER PUBLICATIONS

Extended European Search Report in the European Application No. 18939122.0, dated May 18, 2022, (9p).

3GPP TSG-RAN WG1 #87 R1-1612311, Reno, USA, Nov. 14-18, 2016, Agenda Item: 7.1.2.5, Source: InterDigital Communications, Title: Random Access Procedure, Document for: Discussion, Decision, (6 pages).

3GPP TSG RAN WG1 AH_NR Meeting R1-1700703, Spokane, USA, Jan. 16-20, 2017, Agenda Item: 5.1.1.4.3, Source: InterDigital Communications, Title: 2-step random access procedure, Document for: Discussion, Decision, (6 pages).

3GPP TSG-RAN WG2 Meeting # NR Ad Hoc R2-1700356, Spokane, USA, Jan. 17-19, 2017, Agenda Item: 3.2.1.4, Source: ASUSTeK, MediaTek Inc., Title: Consideration on use cases of 2-step RACH procedure, Document for: Discussion and Decision, (5 pages).

English translation of the Written Opinion of the International Search Authority in the International Application No. PCT/CN2018/113154, dated Jul. 25, 2019, (3p).

"New SID on NR based Access to Unlicensed Spectrum", Qualcomm, 3GPP TSG RAN Meeting #75 RP-170828 Dubrovnik, Croatia, Mar. 6-9, 2017, (5p).

International Search Report of PCT Application No. PCT/CN2018/113154 dated Jul. 25, 2019 with English translation (4p).

3GPP TSG-RAN WG2 Meeting #NR Ad Hoc R2-1700023, Spokane, USA, Jan. 17-19, 2017, Agenda Item: 3.2.1.4, Source: ASUSTeK, Title: Consideration on use cases of 2-step RACH procedure, Document for: Discussion and Decision.

3GPP TSG RAN WG1 #97 R1-1906747, Reno, USA, May 13-17, 2019, Agenda item: 7.2.1.2, Source: Nokia, Nokia Shanghai Bell, Title: On 2-step RACH Procedure, Document for: Discussion and Decision.

Notice of Allowance of the Chinese application No. 201880002540.X, dated Oct. 10, 2022.

* cited by examiner

METHOD AND APPARATUS FOR TRANSMITTING RANDOM ACCESS INDICATION INFORMATION

CROSS-REFERENCE TO RELATED APPLICATIONS

This application is a U.S. national stage of International Patent Application No. PCT/CN2018/113154 filed on Oct. 31, 2018, the disclosure of which is incorporated herein by reference in its entirety.

TECHNICAL FIELD

The present disclosure generally relates to the technical field of communication, and more particularly, to a method and apparatus for transmitting random access indication information.

BACKGROUND

In 5th-Generation (5G) (5G mobile communication system), User Equipment (UE) may frequently implement random access based on service requirements. In an unlicensed 5G band, a Listen Before Talk (LBT) principle is required to be followed. Under the LBT principle, there may exist a random access delay. For increasing a success rate of random access, contention-based random access may be shortened to two steps. Then, for contention-based random access, a base station and UE may support both a 2-step implementation manner and a 4-step implementation manner. How to determine a specific random access manner is in need of consideration.

SUMMARY

Embodiments of the present disclosure provide a method and apparatus for transmitting random access indication information.

According to a first aspect of the embodiments of the present disclosure, a method for transmitting random access indication information is provided, which may be implemented by a base station and include that:

indication information about random access is generated, the indication information indicating that 2-step contention-based random access is supported or 4-step contention-based random access is supported; and a system message is broadcast to UE, the system message including the indication information.

The technical solution provided in the embodiment of the present disclosure may have the following beneficial effect: a system message is improved by adding indication information to indicate whether 2-step contention-based random access is supported or not, so that UE is helped to complete random access better.

In an embodiment, the system message may include an indication bit configured to bear the indication information, and the indication bit may be 1 bit.

The technical solution provided in the embodiment of the present disclosure may have the following beneficial effect: the indication information may be represented by 1 indication bit, so that less network resources are occupied.

In an embodiment, the system message may include an indication bit configured to bear the indication information; when a value of the indication bit is true, the indication information may indicate that 2-step contention-based random access is supported; and when the value of the indication bit is false, the indication information may indicate that 4-step contention-based random access is supported; or when a value of the indication bit is true, the indication information may indicate that 4-step contention-based random access is supported; and when the value of the indication bit is false, the indication information may indicate that 2-step contention-based random access is supported.

The technical solution provided in the embodiment of the present disclosure may have the following beneficial effect: another valuing manner for the indication bit is provided, which may also represent the indication information.

In an embodiment, when the indication information indicates that 2-step contention-based random access is supported, the system message may include an indication bit; and when the indication information indicates that 4-step contention-based random access is supported, the message system may default on the indication bit.

Or, when the indication information indicates that 2-step contention-based random access is supported, the message system may default an indication bit; and when the indication information indicates that 4-step contention-based random access is supported, the message system may include the indication bit.

The technical solution provided in the embodiment of the present disclosure may have the following beneficial effect: the indication bit may default, so that occupied network resources can be further reduced under the existence of the indication information.

In an embodiment, the indication information may include resource configuration information required when 2-step contention-based random access is supported and/or resource configuration information required when 4-step contention-based random access is supported.

The system message may include a first information unit and/or a second information unit, the first information unit may be configured to bear the resource configuration information required when 2-step contention-based random access is supported, and the second information unit may be configured to bear the resource configuration information required when 4-step contention-based random access is supported.

The technical solution provided in the embodiment of the present disclosure may have the following beneficial effect: the resource configuration information is configured to represent the indication information and simultaneously complete resource configuration, so that network resources are saved.

In an embodiment, the system message may include a Master Information Block (MIB) or a System Information Block 1 (SIB1).

The technical solution provided in the embodiment of the present disclosure may have the following beneficial effect: the embodiment may be implemented through multiple system messages and is applicable to multiple application scenarios.

According to a second aspect of the embodiments of the present disclosure, a method for transmitting random access indication information is provided, which may be implemented by UE and include that:

a system message broadcast by a base station is received, the system message including indication information and the indication information indicating that 2-step contention-based random access is supported or 4-step contention-based random access is supported;

the indication information is recognized from the system message; and a random access manner corresponding to the indication information is determined.

In an embodiment, the system message may include an indication bit configured to bear the indication information, and the indication bit may be 1 bit.

The operation that the indication information is recognized from the system message may include that:

the indication bit is parsed from the system message, and the indication information is recognized from the indication bit.

In an embodiment, the system message may include an indication bit configured to bear the indication information.

When a value of the indication bit is true, the indication information may indicate that 2-step contention-based random access is supported; and when the value of the indication bit is false, the indication information may indicate that 4-step contention-based random access is supported; or when a value of the indication bit is true, the indication information may indicate that 4-step contention-based random access is supported; and when the value of the indication bit is false, the indication information may indicate that 2-step contention-based random access is supported.

The operation that the indication information is recognized from the system message may include that:

the indication bit is parsed from the system message, and the indication information is recognized from the indication bit.

The operation that the random access manner corresponding to the indication information is determined may include that:

when the value of the indication bit is true, it is determined that the indication information indicates that 2-step contention-based random access is supported; and when the value of the indication bit is false, it is determined that the indication information indicates that 4-step contention-based random access is supported; or when the value of the indication bit is true, it is determined that the indication information indicates that 4-step contention-based random access is supported; and when the value of the indication bit is false, it is determined that the indication information indicates that 2-step contention-based random access is supported.

In an embodiment, when the indication information indicates that 2-step contention-based random access is supported, the system message may include an indication bit.

When the indication information indicates that 4-step contention-based random access is supported, the message system may default on the indication bit;

the operation that the random access manner corresponding to the indication information is determined may include that:

when the indication bit is parsed from the system message, it is determined that the indication information corresponds to 2-step contention-based random access; and when the indication bit is not parsed from the system message, it is determined that the indication information corresponds to 4-step contention-based random access.

Or, when the indication information indicates that 2-step contention-based random access is supported, the message system may default on the indication bit; and when the indication information indicates that 4-step contention-based random access is supported, the message system may include the indication bit;

the operation that the random access manner corresponding to the indication information is determined may include that:

when the indication bit is parsed from the system message, it is determined that the indication information corresponds to 4-step contention-based random access, and when the indication bit is not parsed from the system message, it is determined that the indication information corresponds to 2-step contention-based random access.

In an embodiment, the indication information may include resource configuration information required when 2-step contention-based random access is supported and/or resource configuration information required when 4-step contention-based random access is supported.

The system message may include a first information unit and/or a second information unit, the first information unit may be configured to bear the resource configuration information required when 2-step contention-based random access is supported, and the second information unit may be configured to bear the resource configuration information required when 4-step contention-based random access is supported.

The operation that the indication information is recognized from the system message may include that:

the first information unit and/or the second information unit are/is parsed from the system message, and the resource configuration information is recognized from the first information unit and/or the second information unit.

In an embodiment, the system message may include a MIB or a SIB1.

According to a third aspect of the embodiments of the present disclosure, an apparatus for transmitting random access indication information is provided, which may include:

a generation module, configured to generate indication information about random access, the indication information indicating that 2-step contention-based random access is supported or 4-step contention-based random access is supported; and a broadcast module, configured to broadcast a system message to UE, the system message including the indication information.

In an embodiment, the system message may include an indication bit configured to bear the indication information, and the indication bit may be 1 bit.

In an embodiment, the system message may include an indication bit configured to bear the indication information.

When a value of the indication bit is true, the indication information may indicate that 2-step contention-based random access is supported; and when the value of the indication bit is false, the indication information may indicate that 4-step contention-based random access is supported; or when a value of the indication bit is true, the indication information may indicate that 4-step contention-based random access is supported; and when the value of the indication bit is false, the indication information may indicate that 2-step contention-based random access is supported.

In an embodiment, when the indication information indicates that 2-step contention-based random access is supported, the system message may include an indication bit; and when the indication information indicates that 4-step contention-based random access is supported, the message system may default on the indication bit.

Or,
when the indication information indicates that 2-step contention-based random access is supported, the message system may default on an indication bit; and when the indication information indicates that 4-step contention-based random access is supported, the message system may include the indication bit.

In an embodiment, the indication information may include resource configuration information required when 2-step contention-based random access is supported and/or resource configuration information required when 4-step contention-based random access is supported.

The system message may include a first information unit and/or a second information unit, the first information unit may be configured to bear the resource configuration information required when 2-step contention-based random access is supported, and the second information unit may be configured to bear the resource configuration information required when 4-step contention-based random access is supported.

In an embodiment, the system message may include a MIB or a SIB1.

According to a fourth aspect of the embodiments of the present disclosure, an apparatus for transmitting random access indication information is provided, which may be implemented by UE and include:
a receiving module, configured to receive a system message broadcast by a base station, the system message including indication information and the indication information indicating that 2-step contention-based random access is supported or 4-step contention-based random access is supported;
a recognition module, configured to recognize the indication information from the system message; and
a determination module, configured to determine a random access manner corresponding to the indication information.

In an embodiment, the system message may include an indication bit configured to bear the indication information, and the indication bit may be 1 bit.

The recognition module may include:
a first recognition submodule, configured to parse the indication bit from the system message and recognize the indication information from the indication bit.

In an embodiment, the system message may include an indication bit configured to bear the indication information.

The recognition module may include:
a second recognition submodule, configured to parse the indication bit from the system message and recognize the indication information from the indication bit.

The determination module may include a first determination submodule or a second determination submodule.

The first determination submodule may be configured to, when the value of the indication bit is true, determine that the indication information indicates that 2-step contention-based random access is supported; and when the value of the indication bit is false, determine that the indication information indicates that 4-step contention-based random access is supported.

The second determination submodule may be configured to, when the value of the indication bit is true, determine that the indication information indicates that 4-step contention-based random access is supported; and when the value of the indication bit is false, determine that the indication information indicates that 2-step contention-based random access is supported.

In an embodiment, when the indication information indicates that 2-step contention-based random access is supported, the system message may include the indication bit; and when the indication information indicates that 4-step contention-based random access is supported, the message system may default on the indication bit;
the determination module may include:
a third determination submodule, configured to, when the indication bit is parsed from the system message, determine that the indication information corresponds to 2-step contention-based random access, and
a fourth determination submodule, configured to, when the indication bit is not parsed from the system message, determine that the indication information corresponds to 4-step contention-based random access.

Or,
when the indication information indicates that 2-step contention-based random access is supported, the message system may default on the indication bit; and when the indication information indicates that 4-step contention-based random access is supported, the message system may include the indication bit;
the determination module may include:
a fifth determination submodule, configured to, when the indication bit is parsed from the system message, determine that the indication information corresponds to 4-step contention-based random access, and
a sixth determination submodule, configured to, when the indication bit is not parsed from the system message, determine that the indication information corresponds to 2-step contention-based random access.

In an embodiment, the indication information may include resource configuration information required when 2-step contention-based random access is supported and/or resource configuration information required when 4-step contention-based random access is supported.

The system message may include a first information unit and/or a second information unit, the first information unit may be configured to bear the resource configuration information required when 2-step contention-based random access is supported, and the second information unit may be configured to bear the resource configuration information required when 4-step contention-based random access is supported.

The recognition module may include:
a third recognition submodule, configured to parse the first information unit and/or the second information unit from the system message and recognize the resource configuration information from the first information unit and/or the second information unit.

In an embodiment, the system message may include a MIB or a SIB1.

According to a fifth aspect of the embodiments of the present disclosure, an apparatus for transmitting random access indication information is provided, which may include:
a processor; and
memory storing instructions executable by the processor, wherein the processor may be configured to:
generate indication information about random access, the indication information indicating that 2-step contention-based random access is supported or 4-step contention-based random access is supported; and broadcast a system message to UE, the system message including the indication information.

According to a sixth aspect of the embodiments of the present disclosure, an apparatus for transmitting random access indication information is provided, which may include:

a processor; and memory storing instructions executable by the processor, wherein the processor may be configured to:

receive a system message broadcast by a base station, the system message including indication information and the indication information indicating that 2-step contention-based random access is supported or 4-step contention-based random access is supported;

recognize the indication information from the system message; and determine a random access manner corresponding to the indication information.

According to a seventh aspect of the embodiments of the present disclosure, a computer-readable storage medium is provided, in which a computer instruction may be stored, wherein the instruction may be executed by a processor to carry out the method implemented in a base station.

According to an eighth aspect of the embodiments of the present disclosure, a computer-readable storage medium is provided, in which a computer instruction may be stored, wherein the instruction may be executed by a processor to carry out the method implemented in UE.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure.

In a 5G system, random access is classified into contention-based random access and contention-free random access. Contention-based random access involves four steps.

In Step 1, UE sends a random access preamble to request for random access.

In Step 2, a base station feeds back a Random Access Response (RAR), and the UE decodes the RAR based on a Random Access Radio Network Temporary Identifier (RA-RNTI).

In Step 3, the UE sends a random response message 3. The random response message 3 may include a Temporary Cell Radio Network Temporary Identifier (TC-RNTI).

In Step 4, the base station feeds back a random response message 4. The random response message 4 may include a Cell Radio Network Temporary Identifier (C-RNTI).

An independent networking design of an unlicensed 5G spectrum is required to follow an LBT mechanism, namely a channel is required to be monitored before a message is sent in either uplink or downlink direction in a random access process. When there are no available time-frequency resources, present transmission may be stopped and a next time-frequency resource is continued to be monitored. As a result, a delay may be increased, and the random access efficiency may be affected. Therefore, a solution may be implementing contention-based random access by two steps instead. For example, the messages in Step 1 and Step 3 are combined into one message for transmission, and the messages in Step 2 and Step 4 are combined into one message for transmission. In such a manner, the base station may support both 2-step contention-based random access and 4-step contention-based random access or support 4-step contention-based random access only. There is brought such a problem that the UE does not know specific contention-based random access supported by the base station as well as a specific contention-based random access process to be adopted.

For solving the problem, in the embodiments, a system message is improved by adding indication information configured to indicate 2-step contention-based random access is supported or 4-step contention-based random access is supported.

Figure 1:
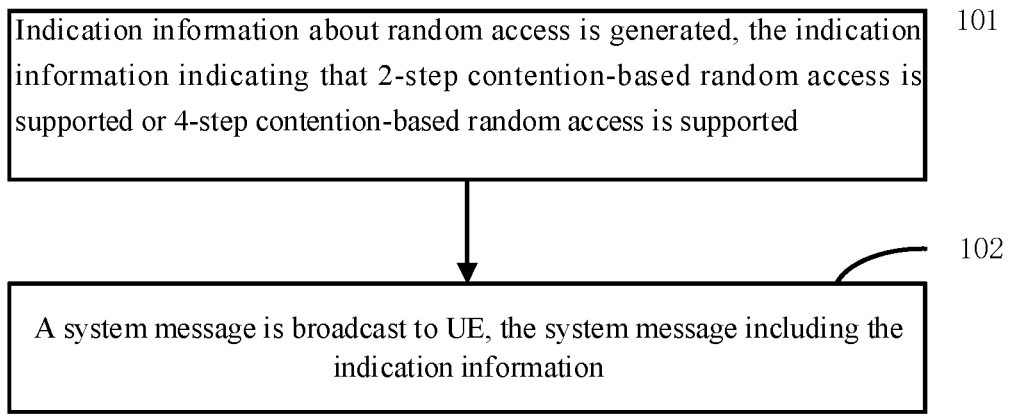
FIG. 1 is a flow chart showing a method for transmitting random access indication information according to an exemplary embodiment.

FIG. 1 is a flow chart showing a method for transmitting random access indication information according to an exemplary embodiment. The method for transmitting random access indication information is implemented by an access network apparatus such as a base station. As shown in FIG. 1, the method includes the following Steps 101 to 102.

In Step 101, indication information about random access is generated, the indication information indicating that 2-step contention-based random access is supported or 4-step contention-based random access is supported.

In Step 102, a system message is broadcast to UE, the system message including the indication information.

In the embodiments, the system message is improved by adding the indication information configured to indicate 2-step contention-based random access is supported or 4-step contention-based random access is supported. When the indication information indicates that 2-step contention-based random access is supported, the indication information indicates that the base station supports both 2-step contention-based random access and 4-step contention-based random access. When the indication information indicates that 4-step contention-based random access is supported, the indication information indicates that the base station supports 4-step contention-based random access only.

The UE may support both 2-step contention-based random access and 4-step contention-based random access. When the indication information indicates that 2-step contention-based random access is supported, the UE may preferentially adopt 2-step contention-based random access. When the indication information indicates that 4-step contention-based random access is supported, the UE can adopt 4-step contention-based random access only. When the UE supports 4-step contention-based random access only, 4-step contention-based random access can be adopted only whatever the indication information indicates.

When the base station supports both 2-step contention-based random access and 4-step contention-based random access, the base station may parse a received message at first in a 2-step contention-based random access manner. In a case of successful parsing, the base station may determine that the UE adopts the 2-step contention-based random access manner. In a case of unsuccessful parsing, the base station may determine that the UE adopts a 4-step contention-based random access manner and then parse the received message in the 4-step contention-based random access manner. The base station may also parse the received message at first in the 4-step contention-based random access manner. No limits are made in the embodiment.

The indication information may be represented in multiple manners, referring to the following embodiments.

In an embodiment, the system message may include an indication bit configured to bear the indication information, and the indication bit may be 1 bit. The indication bit is only 1 bit, so that less network resources are occupied.

When a value of the indication bit is 1, the indication information indicates that 2-step contention-based random access is supported; and when the value is 0, the indication information indicates that 4-step contention-based random access is supported. Or, when the value of the indication bit is 0, the indication information indicates that 2-step contention-based random access is supported; and when the value is 1, the indication information indicates that 4-step contention-based random access is supported.

The UE may learn about specific contention-based random access supported by the base station based on the value of the indication bit.

In the embodiments, the system message may be a MIB or a SIB1.

In an embodiment, the system message may include an indication bit configured to bear the indication information. When a value of the indication bit is true, the indication information indicates that 2-step contention-based random access is supported; and when the value of the indication bit is false, the indication information indicates that 4-step contention-based random access is supported.

Or, when a value of the indication bit is true, the indication information indicates that 4-step contention-based random access is supported; and when the value of the indication bit is false, the indication information indicates that 2-step contention-based random access is supported.

In the embodiments, another valuing manner for the indication bit is provided, namely the value of the indication bit may be true or false. When the value of the indication bit is true, the indication information indicates that 2-step contention-based random access is supported; and when the value of the indication bit is false, the indication information indicates that 4-step contention-based random access is supported. Or, when the value of the indication bit is true, the indication information indicates that 4-step contention-based random access is supported; and when the value of the indication bit is false, the indication information indicates that 2-step contention-based random access is supported.

The UE may learn about specific contention-based random access supported by the base station based on the value of the indication bit.

In the embodiments, the system message may be a MIB or a SIB1.

In an embodiment, when the indication information indicates that 2-step contention-based random access is supported, the system message may include an indication bit; and when the indication information indicates that 4-step contention-based random access is supported, the system message may default on the indication bit.

Or, when the indication information indicates that 2-step contention-based random access is supported, the system message may default on an indication bit; and when the indication information indicates that 4-step contention-based random access is supported, the system message may include the indication bit.

In the embodiments, defaulting of the indication bit is also a kind of indication information, and network resources may be saved.

In the embodiments, the system message may be a MIB or a SIB1.

In an embodiment, the indication information may include resource configuration information required when 2-step contention-based random access is supported and/or resource configuration information required when 4-step contention-based random access is supported.

The system message may include a first information unit and/or a second information unit. The first information unit is configured to bear the resource configuration information required when 2-step contention-based random access is supported, and the second information unit is configured to bear the resource configuration information required when 4-step contention-based random access is supported.

In the embodiments, the indication information may be represented by the resource configuration information. In a case that the base station configures the resource configuration information required by 2-step contention-based random access, the indication information indicates that the base station supports 2-step contention-based random access. In a case that the base station configures the resource configuration information required by 4-step contention-based random access only, the indication information indicates that the base station supports 4-step contention-based random access only. In a case that the base station configures the resource configuration information required by 2-step contention-based random access and 4-step contention-based random access, the indication information indicates that the base station supports both 2-step contention-based random access and 4-step contention-based random access.

In the embodiments, no additional indication bit is required for indication, so that network resources are saved. The embodiment may also be combined with the above embodiments, namely the system message may include an indication bit and corresponding resource configuration information.

In the embodiments, the system message may be a SIB1.

An implementation process of the base station is introduced above. Correspondingly, there are also some improvements made on a UE side. An implementation process of the UE side will be introduced below.

Figure 2:
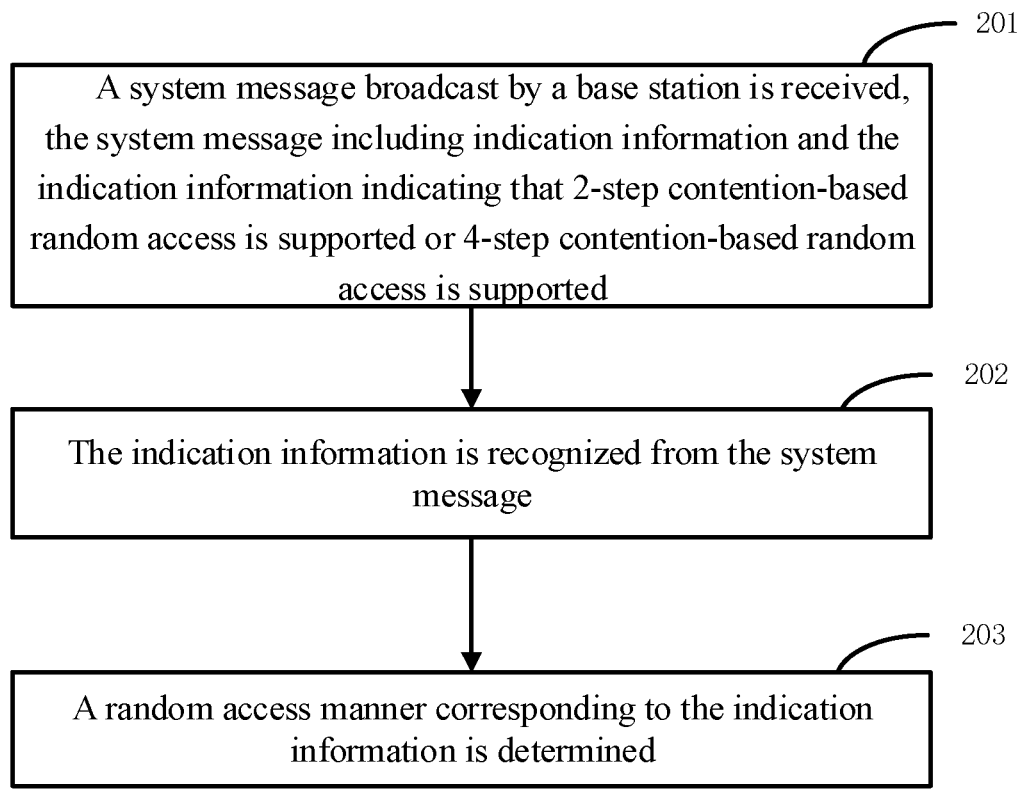
FIG. 2 is a flow chart showing a method for transmitting random access indication information according to an exemplary embodiment.

FIG. 2 is a flow chart showing a method for transmitting random access indication information according to an exemplary embodiment. The method for transmitting random access indication information is implemented by UE. The UE may be a mobile phone, a computer, a digital broadcast terminal, a messaging apparatus, a gaming console, a tablet, a medical apparatus, exercise equipment, a personal digital assistant and the like. As shown in FIG. 2, the method includes the following Steps 201 to 203.

In Step 201, a system message broadcast by a base station is received, the system message including indication information and the indication information indicating that 2-step contention-based random access is supported or 4-step contention-based random access is supported.

In Step 202, the indication information is recognized from the system message.

In Step 203, a random access manner corresponding to the indication information is determined.

In the embodiments, the UE may determine a random access manner corresponding to indication information and further determine an adopted contention-based random access manner in combination with its own capability. The UE may support both 2-step contention-based random access and 4-step contention-based random access. In a case that the UE supports both 2-step contention-based random access and 4-step contention-based random access, when the indication information indicates that 2-step contention-based random access is supported, the UE may preferentially adopt 2-step contention-based random access; and when the indication information indicates that 4-step contention-based random access is supported, the UE may adopt 4-step contention-based random access only. When the UE supports 4-step contention-based random access only, 4-step contention-based random access may be adopted only whatever the indication information indicates.

In an embodiment, the system message may include an indication bit configured to bear the indication information, and the indication bit may be 1 bit.

Step 202 includes Step A.

In Step A, the indication bit is parsed from the system message, and the indication information is recognized from the indication bit.

When a value of the indication bit is 1, the indication information indicates that 2-step contention-based random access is supported; and when the value is 0, the indication information indicates that 4-step contention-based random access is supported. Or, when the value of the indication bit is 0, the indication information indicates that 2-step contention-based random access is supported; and when the value is 1, the indication information indicates that 4-step contention-based random access is supported.

The UE may learn about specific contention-based random access supported by the base station based on the value of the indication bit.

Step 203 includes that:

responsive to determining that the indication bit is 1, it is determined that 2-step contention-based random access is supported; and responsive to determining that the indication bit is 0, it is determined that 4-step contention-based random access is supported;

or, responsive to determining that the indication bit is 0, it is determined that 2-step contention-based random access is supported; and responsive to determining that the indication bit is 1, it is determined that 4-step contention-based random access is supported.

In the embodiments, the system message may be a MIB or a SIB1.

In an embodiment, the system message may include an indication bit configured to bear the indication information. When the value of the indication bit is true, the indication information indicates that 2-step contention-based random access is supported; and when the value of the indication bit is false, the indication information indicates that 4-step contention-based random access is supported.

Or, when the value of the indication bit is true, the indication information indicates that 4-step contention-based random access is supported; and when the value of the indication bit is false, the indication information indicates that 2-step contention-based random access is supported.

Step 202 includes Step A.

In Step A, the indication bit is parsed from the system message, and the indication information is recognized from the indication bit.

In the embodiments, the UE may learn about specific contention-based random access supported by the base station according to whether the value of the indication bit is true or false.

Step 203 includes that:

when the value of the indication bit is true, it is determined that the indication information indicates that 2-step contention-based random access is supported; and when the value of the indication bit is false, it is determined that the indication information indicates that 4-step contention-based random access is supported;

or, when the value of the indication bit is true, it is determined that the indication information indicates that 4-step contention-based random access is supported; and when the value of the indication bit is false, it is determined that the indication information indicates that 2-step contention-based random access is supported.

In the embodiments, the system message may be a MIB or a SIB1.

In an embodiment, the indication information is required to indicate two conditions that 2-step contention-based random access is supported or 4-step contention-based random access is supported. In the embodiments, the two conditions may be represented by whether the indication bit defaults or not, referring to the following embodiments.

In an embodiment, when the indication information indicates that 2-step contention-based random access is supported, the system message includes the indication bit; and when the indication information indicates that 4-step contention-based random access is supported, the message system defaults on the indication bit.

Step 203 includes Step B1 to Step B2.

In Step B1, when the indication bit is parsed from the system message, it is determined that the indication information corresponds to 2-step contention-based random access.

In Step B2, when the indication bit is not parsed from the system message, it is determined that the indication information corresponds to 4-step contention-based random access.

Or
when the indication information indicates that 2-step contention-based random access is supported, the message system defaults on the indication bit, and
when the indication information indicates that 4-step contention-based random access is supported, the message system includes the indication bit.

Step 203 includes Step B3 to Step B4.

In Step B3, when the indication bit is parsed from the system message, it is determined that the indication information corresponds to 4-step contention-based random access.

In Step B4, when the indication bit is not parsed from the system message, it is determined that the indication information corresponds to 2-step contention-based random access.

In the embodiments, the system message may be a MIB or a SIB1.

In the embodiments, the UE may determine the indication information based on whether the indication bit defaults or not. A length of the system message may change along with whether the indication bit defaults or not, or a length of an information unit configured to bear the indication bit in the system message may change along with whether the indication bit defaults or not. The UE may determine whether the indication bit defaults or not based on the length of the system message or the information unit. When the indication bit does not default, the value of the indication bit may be 0, 1, true or false. Any value of the indication information indicates only one condition: support for 2-step contention-based random access or support for 4-step contention-based random access.

In the embodiments, when the indication bit defaults, network resources may further be saved.

In an embodiment, the indication information may include resource configuration information required when 2-step contention-based random access is supported and/or resource configuration information required when 4-step contention-based random access is supported.

The system message may include a first information unit and/or a second information unit. The first information unit is configured to bear the resource configuration information required when 2-step contention-based random access is supported, and the second information unit is configured to bear the resource configuration information required when 4-step contention-based random access is supported.

Step 202 includes Step C.

In Step C, the first information unit and/or the second information unit are/is parsed from the system message, and the resource configuration information is recognized from the first information unit and/or the second information unit.

In the embodiments, the system message may include a SIB1.

In the embodiments, the resource configuration information may be configured to represent the indication information. When the UE parses the resource configuration information required by 2-step contention-based random access, the indication information indicates that the base station supports 2-step contention-based random access. When the UE parses the resource configuration information required by 4-step contention-based random access only, the indication information indicates that the base station supports 4-step contention-based random access only. When the UE parses the resource configuration information required by 2-step contention-based random access and 4-step contention-based random access, the indication information indicates that the base station supports both 2-step contention-based random access and 4-step contention-based random access.

The UE, after parsing the resource configuration information, may use corresponding resources according to a practical condition.

In the embodiments, no additional indication bit is required for indication, so that network resources are saved. The embodiment may also be combined with the above embodiments, namely the system message may include the indication bit and the corresponding resource configuration information.

In the embodiments, multiple indication manners are provided, and a system may configure the same indication manner for the base station and the UE.

The implementation process will be introduced below in combination with a base station and UE.

Figure 3:
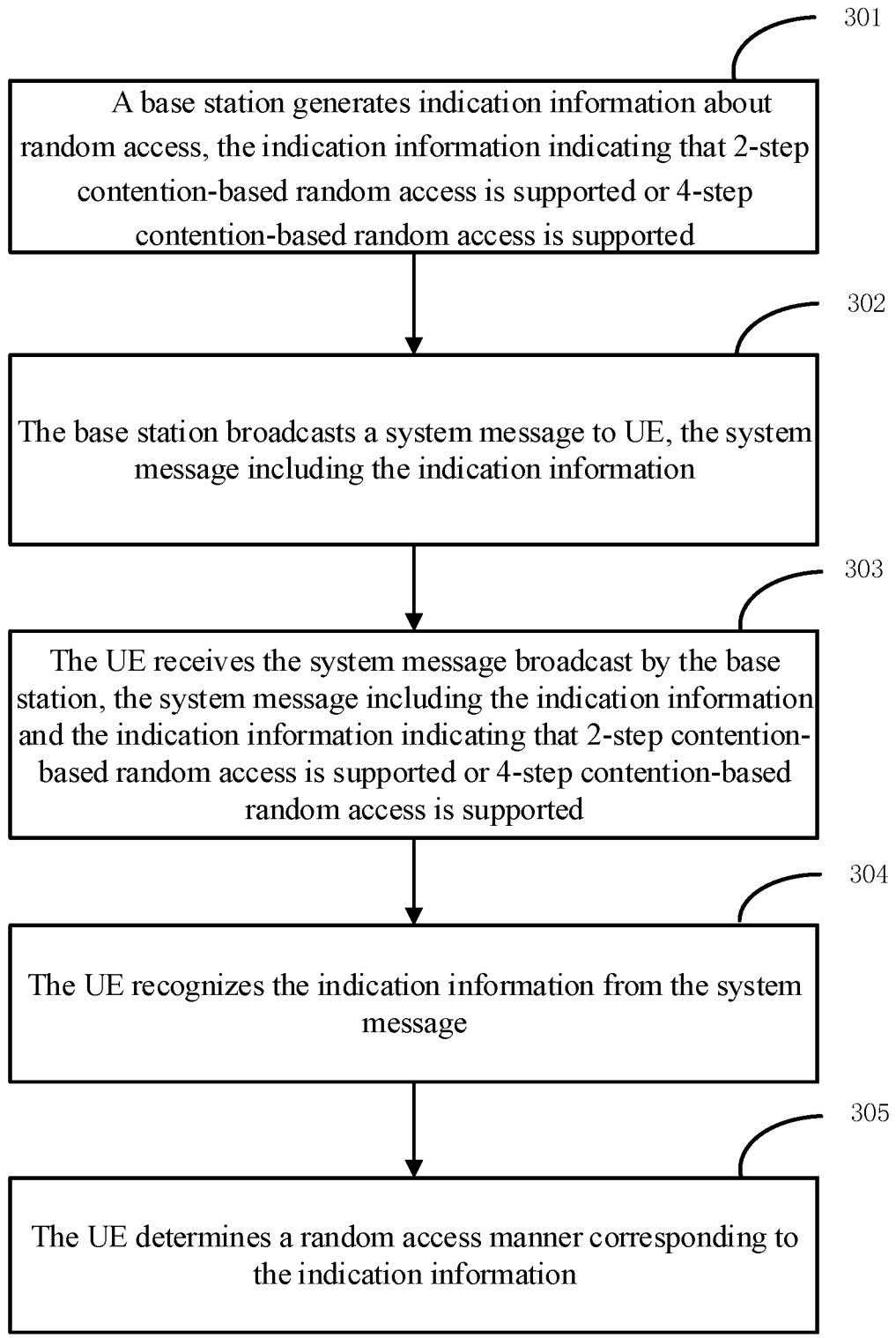
FIG. 3 is a flow chart showing a method for transmitting random access indication information according to an exemplary embodiment.

FIG. 3 is a flow chart showing a method for transmitting random access indication information according to an exemplary embodiment. As shown in FIG. 3, the method includes the following Steps 301 to 305.

In Step 301, a base station generates indication information about random access, the indication information indicating that 2-step contention-based random access is supported or 4-step contention-based random access is supported.

In Step 302, the base station broadcasts a system message to UE, the system message including the indication information.

In Step 303, the UE receives the system message broadcast by the base station, the system message including the indication information and the indication information indicating that 2-step contention-based random access is supported or 4-step contention-based random access is supported.

In Step 304, the UE recognizes the indication information from the system message.

In Step 305, the UE determines a random access manner corresponding to the indication information.

The below is an apparatus embodiment of the present disclosure, which may be configured to carry out the method embodiments of the present disclosure.

Figure 4:
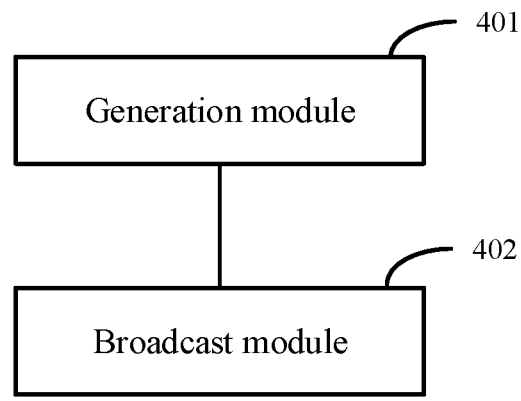
FIG. 4 is a block diagram of an apparatus for transmitting random access indication information according to an exemplary embodiment.

FIG. 4 is a block diagram of an apparatus for transmitting random access indication information according to an exemplary embodiment. The apparatus may be implemented into part or all of an electronic device through software, hardware or a combination of the two. The apparatus for transmitting random access indication information is implemented by a base station. Referring to FIG. 4, the apparatus includes a generation module 401 and a broadcast module 402.

The generation module 401 is configured to generate indication information about random access, the indication information indicating that 2-step contention-based random access is supported or 4-step contention-based random access is supported.

The broadcast module 402 is configured to broadcast a system message to UE, the system message including the indication information.

In an embodiment, the system message may include an indication bit configured to bear the indication information, and the indication bit is 1 bit.

In an embodiment, the system message may include an indication bit configured to bear the indication information. When a value of the indication bit is true, the indication information indicates that 2-step contention-based random access is supported; and when the value of the indication bit is false, the indication information indicates that 4-step contention-based random access is supported.

Or, when a value of the indication bit is true, the indication information indicates that 4-step contention-based random access is supported; and when the value of the indication bit is false, the indication information indicates that 2-step contention-based random access is supported.

In an embodiment, when the indication information indicates that 2-step contention-based random access is supported, the system message includes an indication bit; and when the indication information indicates that 4-step contention-based random access is supported, the message system defaults on the indication bit.

Or, when the indication information indicates that 2-step contention-based random access is supported, the message system defaults on an indication bit; and when the indication information indicates that 4-step contention-based random access is supported, the message system includes the indication bit.

In an embodiment, the indication information may include resource configuration information required when 2-step contention-based random access is supported and/or resource configuration information required when 4-step contention-based random access is supported.

The system message may include a first information unit and/or a second information unit. The first information unit is configured to bear the resource configuration information required when 2-step contention-based random access is supported, and the second information unit is configured to bear the resource configuration information required when 4-step contention-based random access is supported.

In an embodiment, the system message may include a MIB or a SIB1.

Figure 5:
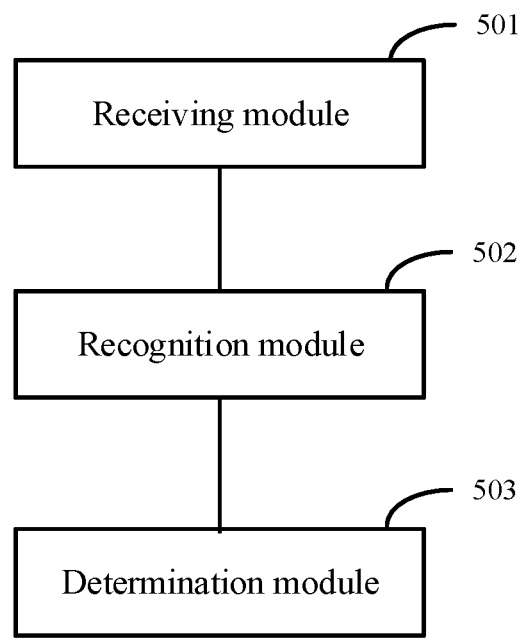
FIG. 5 is a block diagram of an apparatus for transmitting random access indication information according to an exemplary embodiment.

FIG. 5 is a block diagram of an apparatus for transmitting random access indication information according to an exemplary embodiment. The apparatus may be implemented into part or all of an electronic device through software, hardware or a combination of the two. The apparatus for transmitting random access indication information is implemented by UE. Referring to FIG. 5, the apparatus includes a receiving module 501, a recognition module 502 and a determination module 503.

The receiving module 501 is configured to receive a system message broadcast by a base station, the system message including indication information and the indication information indicating that 2-step contention-based random access is supported or 4-step contention-based random access is supported.

The recognition module 502 is configured to recognize the indication information from the system message.

The determination module 503 is configured to determine a random access manner corresponding to the indication information.

In an embodiment, the system message may include an indication bit configured to bear the indication information, and the indication bit may be 1 bit.

Figure 6:
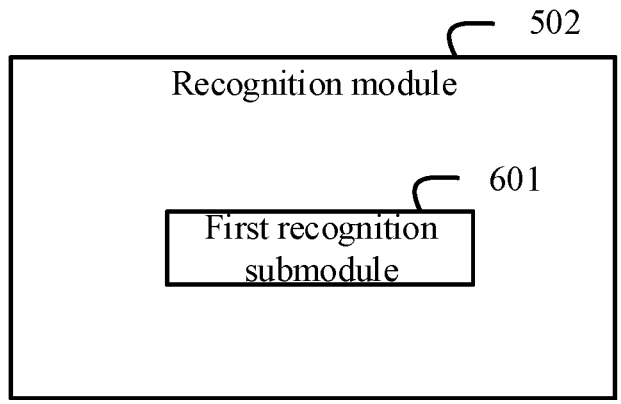
FIG. 6 is a block diagram of a recognition module according to an exemplary embodiment.

As shown in FIG. 6, the recognition module 502 includes a first recognition submodule 601.

The first recognition submodule 601 is configured to parse the indication bit from the system message and recognize the indication information from the indication bit.

In an embodiment, the system message may include an indication bit configured to bear the indication information. When a value of the indication bit is true, the indication information indicates that 2-step contention-based random access is supported; and when the value of the indication bit is false, the indication information indicates that 4-step contention-based random access is supported.

Or, when a value of the indication bit is true, the indication information indicates that 4-step contention-based random access is supported; and when the value of the indication bit is false, the indication information indicates that 2-step contention-based random access is supported.

Figure 7:
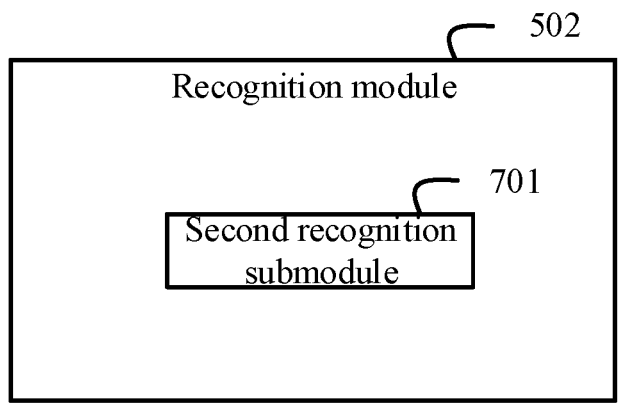
FIG. 7 is a block diagram of a recognition module according to an exemplary embodiment.

As shown in FIG. 7, the recognition module 502 includes a second recognition submodule 701.

The second recognition submodule 701 is configured to parse the indication bit from the system message and recognize the indication information from the indication bit.

In an embodiment, when the indication information indicates that 2-step contention-based random access is supported, the system message includes an indication bit; and when the indication information indicates that 4-step contention-based random access is supported, the message system defaults on the indication bit.

Figure 8A:
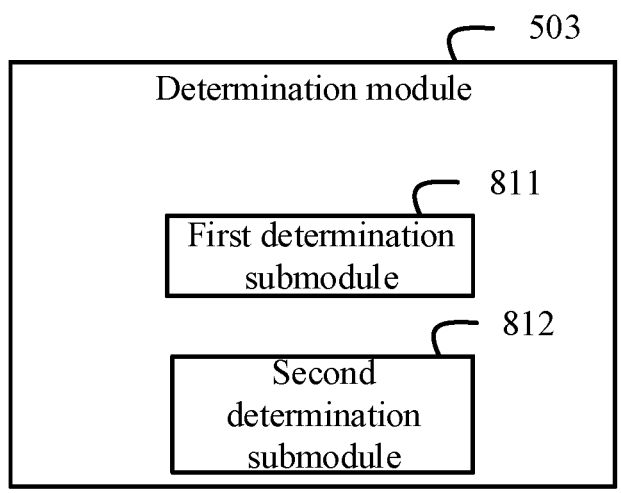
FIG. 8A is a block diagram of a determination module according to an exemplary embodiment.

As shown in FIG. 8A, the determination module 503 includes a first determination submodule 811 or a second determination submodule 812.

The first determination submodule 811 is configured to, when the value of the indication bit is true, determine that the indication information indicates that 2-step contention-based random access is supported; and when the value of the indication bit is false, determine that the indication information indicates that 4-step contention-based random access is supported.

The second determination submodule 812 is configured to, when the value of the indication bit is true, determine that the indication information indicates that 4-step contention-based random access is supported; and when the value of the indication bit is false, determine that the indication information indicates that 2-step contention-based random access is supported.

Figure 8B:
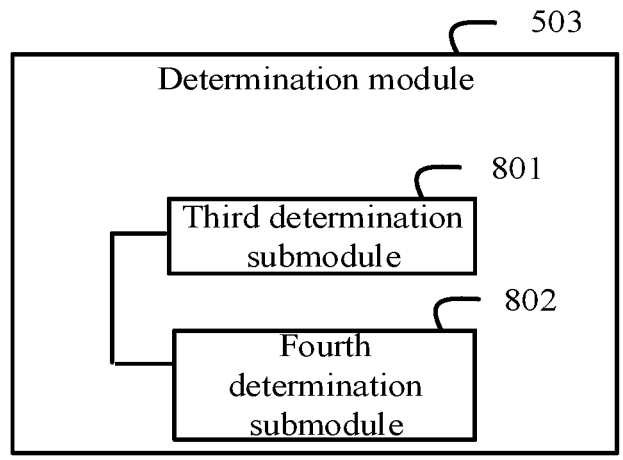
FIG. 8B is a block diagram of a determination module according to an exemplary embodiment.

As shown in FIG. 8B, the determination module 503 includes a third determination submodule 801 or a fourth determination submodule 802.

The third determination submodule 801 is configured to, when the indication bit is parsed from the system message, determine that the indication information corresponds to 2-step contention-based random access.

The fourth determination submodule 802 is configured to, when the indication bit is not parsed from the system message, determine that the indication information corresponds to 4-step contention-based random access.

Or, when the indication information indicates that 2-step contention-based random access is supported, the message system defaults on the indication bit; and when the indication information indicates that 4-step contention-based random access is supported, the message system includes the indication bit.

Figure 9:
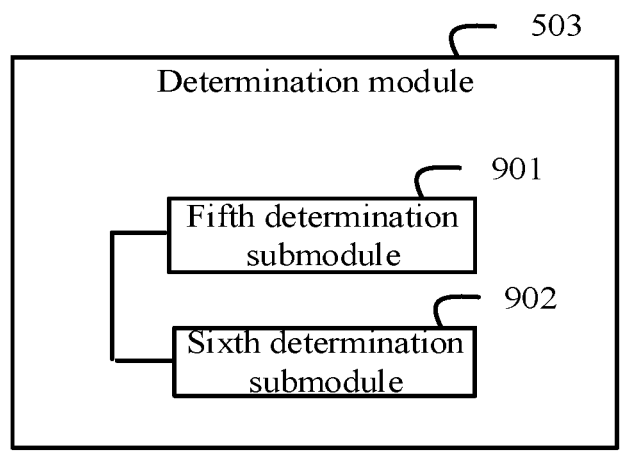
FIG. 9 is a block diagram of a determination module according to an exemplary embodiment.

As shown in FIG. 9, the determination module 503 includes a fifth determination submodule 901 or a sixth determination submodule 902.

The fifth determination submodule 901 is configured to, when the indication bit is parsed from the system message, determine that the indication information corresponds to 4-step contention-based random access.

The sixth determination submodule 902 is configured to, when the indication bit is not parsed from the system message, determine that the indication information corresponds to 2-step contention-based random access.

In an embodiment, the indication information may include resource configuration information required when 2-step contention-based random access is supported and/or resource configuration information required when 4-step contention-based random access is supported.

The system message may include a first information unit and/or a second information unit. The first information unit is configured to bear the resource configuration information required when 2-step contention-based random access is supported, and the second information unit is configured to bear the resource configuration information required when 4-step contention-based random access is supported.

Figure 10:
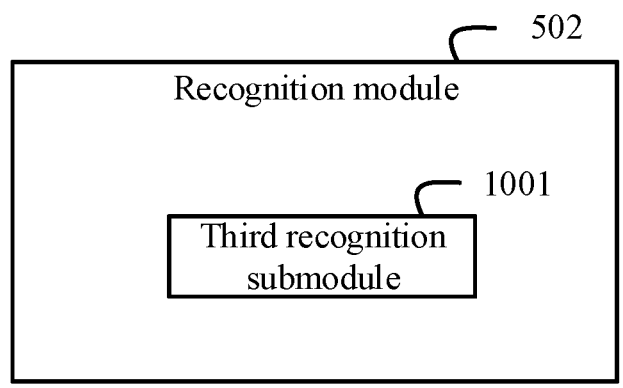
FIG. 10 is a block diagram of a recognition module according to an exemplary embodiment.

As shown in FIG. 10, the recognition module 502 includes a third recognition submodule 1001.

The third recognition submodule 1001 is configured to parse the first information unit and/or the second information unit from the system message and recognize the resource configuration information from the first information unit and/or the second information unit.

In an embodiment, the system message may include a MIB or a SIB1.

Explanations about the apparatus may refer to the descriptions of the method part.

With respect to the apparatus in the above embodiments, the specific manner for the operation executed by each module has been described in detail in the embodiments related to the method, and is not elaborated herein.

Figure 11:
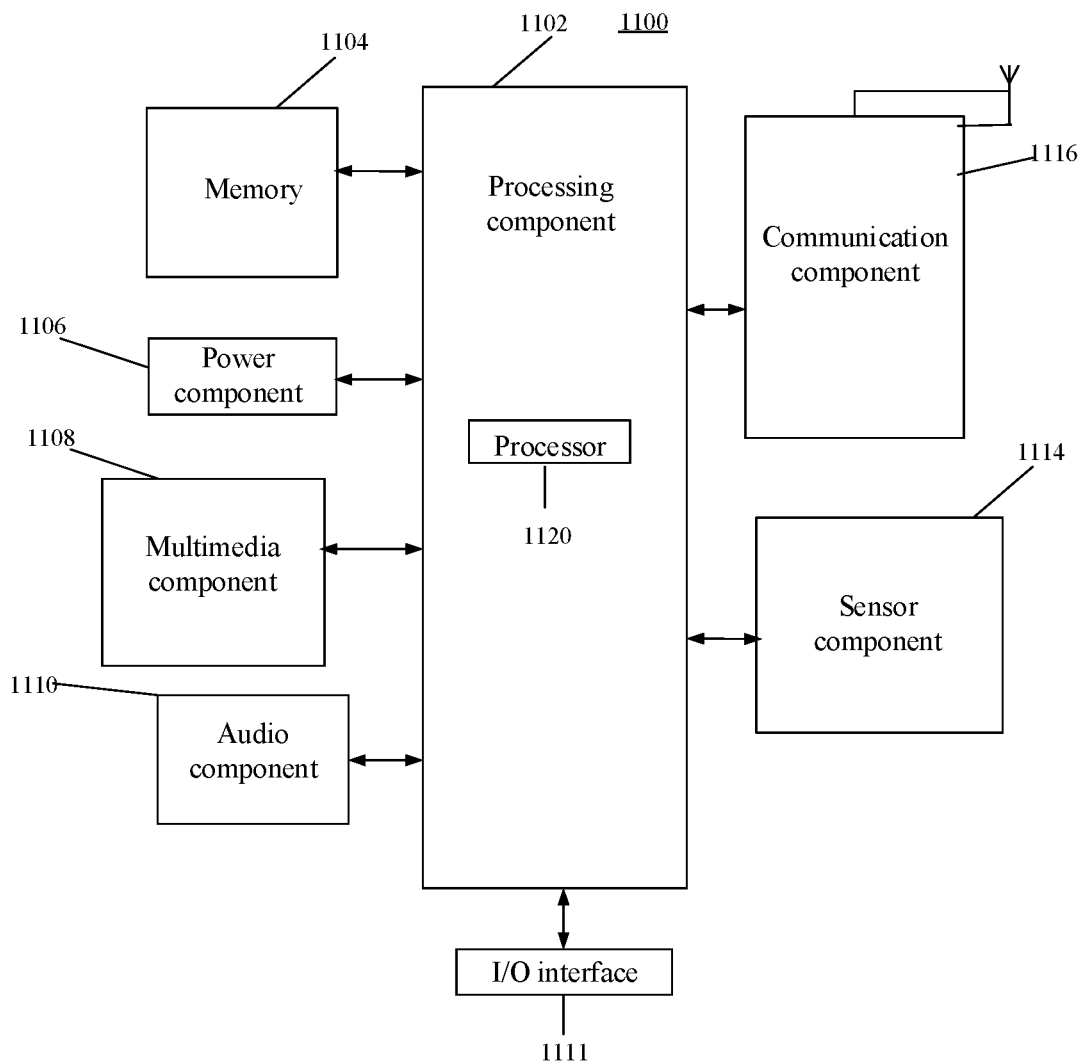
FIG. 11 is a block diagram of an apparatus for transmitting random access indication information according to an exemplary embodiment.

FIG. 11 is a block diagram of an apparatus for transmitting random access indication information according to an exemplary embodiment. For example, the apparatus 1100 may be a mobile phone, a computer, a digital broadcast terminal, a messaging device, a gaming console, a tablet, a medical device, exercise equipment, a personal digital assistant and the like.

The apparatus 1100 may include one or more of the following components: a processing component 1102, a memory 1104, a power component 1106, a multimedia component 1108, an audio component 1110, an Input/Output (I/O) interface 1111, a sensor component 1114, and a communication component 1116.

The processing component 1102 typically controls overall operations of the apparatus 1100, such as the operations associated with display, telephone calls, data communications, camera operations, and recording operations. The processing component 1102 may include one or more processors 1120 to execute instructions to perform all or part of the steps in the abovementioned method. Moreover, the processing component 1102 may include one or more modules which facilitate interaction between the processing component 1102 and the other components. For instance, the processing component 1102 may include a multimedia module to facilitate interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, video, etc. The memory 1104 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1106 provides power for various components of the apparatus 1100. The power component 1106 may include a power management system, one or more power supplies, and other components associated with generation, management and distribution of power for the apparatus 1100.

The multimedia component 1108 includes a screen providing an output interface between the apparatus 1100 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1108 includes a front camera and/or a rear camera. The front camera and/or the rear camera may receive external multimedia data when the apparatus 1100 is in an operation mode, such as a photographing mode or a video mode. Each of the front camera and the rear camera may be a fixed optical lens system or have focusing and optical zooming capabilities.

The audio component 1110 is configured to output and/or input an audio signal. For example, the audio component 1110 includes a Microphone (MIC), and the MIC is configured to receive an external audio signal when the apparatus 1100 is in the operation mode, such as a call mode, a recording mode and a voice recognition mode. The received audio signal may further be stored in the memory 1104 or sent through the communication component 1116. In some embodiments, the audio component 1110 further includes a speaker configured to output the audio signal.

The I/O interface 1111 provides an interface between the processing component 1102 and a peripheral interface module, and the peripheral interface module may be a keyboard, a click wheel, a button and the like. The button may include, but not limited to: a home button, a volume button, a starting button and a locking button.

The sensor component 1114 includes one or more sensors configured to provide status assessment in various aspects for the apparatus 1100. For instance, the sensor component 1114 may detect an on/off status of the apparatus 1100 and relative positioning of components, such as a display and small keyboard of the apparatus 1100, and the sensor component 1114 may further detect a change in a position of the apparatus 1100 or a component of the apparatus 1100, presence or absence of contact between the user and the apparatus 1100, orientation or acceleration/deceleration of the apparatus 1100 and a change in temperature of the apparatus 1100. The sensor component 1114 may include a proximity sensor configured to detect presence of an object nearby without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an acceleration sensor, a gyroscope sensor, a magnetic sensor, a pressure sensor or a temperature sensor.

The communication component 1116 is configured to facilitate wired or wireless communication between the apparatus 1100 and another apparatus. The apparatus 1100 may access a communication-standard-based wireless network, such as a Wireless Fidelity (WiFi) network, a 2nd-Generation (2G) or 3rd-Generation (3G) network or a combination thereof. In an exemplary embodiment, the communication component 1116 receives a broadcast signal or broadcast associated information from an external broadcast management system through a broadcast channel. In an exemplary embodiment, the communication component 1116 further includes a Near Field Communication (NFC) module to facilitate short-range communication. For example, the NFC module may be implemented based on a Radio Frequency Identification (RFID) technology, an Infrared Data Association (IrDA) technology, an Ultra Wide Band (UWB) technology, a Bluetooth (BT) technology and another technology.

In an exemplary embodiment, the apparatus 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1104 including an instruction, and the instruction may be executed by the processor 1120 of the apparatus 1100 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In an exemplary embodiment, an apparatus for transmitting random access indication information is provided, which includes:
  a processor; and
  memory storing instructions executable by the processor, wherein processor is configured to:
  receive a system message broadcast by a base station, the system message including indication information and the indication information indicating that 2-step contention-based random access is supported or 4-step contention-based random access is supported;
  recognize the indication information from the system message; and
  determine a random access manner corresponding to the indication information.

The processor may further be configured to carry out operations as follows.

The system message includes an indication bit configured to bear the indication information, and the indication bit is 1 bit; and
  the operation that the indication information is recognized from the system message includes that:
    the indication bit is parsed from the system message, and the indication information is recognized from the indication bit.

The processor may further be configured to carry out operations as follows.

The system message includes an indication bit configured to bear the indication information.

When a value of the indication bit is true, the indication information indicates that 2-step contention-based random access is supported; and when the value of the indication bit is false, the indication information indicates that 4-step contention-based random access is supported.

Or, when the value of the indication bit is true, the indication information indicates that 4-step contention-based random access is supported; and when the value of the indication bit is false, the indication information indicates that 2-step contention-based random access is supported.

The operation that the indication information is recognized from the system message includes that:
  the indication bit is parsed from the system message, and the indication information is recognized from the indication bit.

The processor may further be configured to carry out operations as follows.

When the indication information indicates that 2-step contention-based random access is supported, the message system includes an indication bit; and when the indication information indicates that 4-step contention-based random access is supported, the message system defaults on the indication bit;
  the operation that the random access manner corresponding to the indication information is determined includes that:
    when the indication bit is parsed from the system message, it is determined that the indication information corresponds to 2-step contention-based random access, and
    when the indication bit is not parsed from the system message, it is determined that the indication information corresponds to 4-step contention-based random access.

Or,
when the indication information indicates that 2-step contention-based random access is supported, the message system defaults on an indication bit; and when the indication information indicates that 4-step contention-based random access is supported, the message system includes the indication bit;
  the operation that the random access manner corresponding to the indication information is determined includes that:
    when the indication bit is parsed from the system message, it is determined that the indication information corresponds to 4-step contention-based random access, and
    when the indication bit is not parsed from the system message, it is determined that the indication information corresponds to 2-step contention-based random access.

The processor may further be configured to carry out operations as follows.

The indication information includes resource configuration information required when 2-step contention-based random access is supported and/or resource configuration information required when 4-step contention-based random access is supported;
  the system message includes a first information unit and/or a second information unit, the first information unit is configured to bear the resource configuration information required when 2-step contention-based random access is supported, and the second information unit is configured to bear the resource configuration information required when 4-step contention-based random access is supported;
  the operation that the indication information is recognized from the system message includes that:
    the first information unit and/or the second information unit are/is parsed from the system message, and the resource configuration information is recognized from the first information unit and/or the second information unit.

The processor may further be configured to carry out operations as follows:

the system message includes a MIB or a SIB1.

According to a computer-readable storage medium, instructions in the storage medium may be executed by a processor of an apparatus to enable the apparatus to implement the method for transmitting random access indication information, the method including that:

a system message broadcast by a base station is received, the system message including indication information and the indication information being configured to indicate that 2-step contention-based random access is supported or 4-step contention-based random access is supported;

the indication information is recognized from the system message; and a random access manner corresponding to the indication information is determined.

The instruction in the storage medium may further include that:

the system message includes an indication bit configured to bear the indication information, and the indication bit is 1 bit; and the operation that the indication information is recognized from the system message includes that:

the indication bit is parsed from the system message, and the indication information is recognized from the indication bit.

The instruction in the storage medium may further include that:

the system message includes an indication bit configured to bear the indication information;

when a value of the indication bit is true, the indication information indicates that 2-step contention-based random access is supported; and when the value of the indication bit is false, the indication information indicates that 4-step contention-based random access is supported;

or, when the value of the indication bit is true, the indication information indicates that 4-step contention-based random access is supported; and when the value of the indication bit is false, the indication information indicates that 2-step contention-based random access is supported;

the operation that the indication information is recognized from the system message includes that:

the indication bit is parsed from the system message, and the indication information is recognized from the indication bit.

The instruction in the storage medium may further include that:

when the indication information indicates that 2-step contention-based random access is supported, the message system includes an indication bit, and when the indication information indicates that 4-step contention-based random access is supported, the message system defaults on the indication bit; the operation that the random access manner corresponding to the indication information is determined includes that: when the indication bit is parsed from the system message, it is determined that the indication information corresponds to 2-step contention-based random access, and when the indication bit is not parsed from the system message, it is determined that the indication information corresponds to 4-step contention-based random access; or, when the indication information indicates that 2-step contention-based random access is supported, the message system defaults on an indication bit; and when the indication information indicates that 4-step contention-based random access is supported, the message system includes the indication bit; the operation that the random access manner corresponding to the indication information is determined includes that: when the indication bit is parsed from the system message, it is determined that the indication information corresponds to 4-step contention-based random access, and when the indication bit is not parsed from the system message, it is determined that the indication information corresponds to 2-step contention-based random access.

The instruction in the storage medium may further include that:

the indication information includes resource configuration information required when 2-step contention-based random access is supported and/or resource configuration information required when 4-step contention-based random access is supported;

the system message includes a first information unit and/or a second information unit, the first information unit is configured to bear the resource configuration information required when 2-step contention-based random access is supported, and the second information unit is configured to bear the resource configuration information required when 4-step contention-based random access is supported;

the operation that the indication information is recognized from the system message includes that:

the first information unit and/or the second information unit are/is parsed from the system message, and the resource configuration information is recognized from the first information unit and/or the second information unit.

The instruction in the storage medium may further include that:

the system message includes a MIB or a SIB1.

Figure 12:
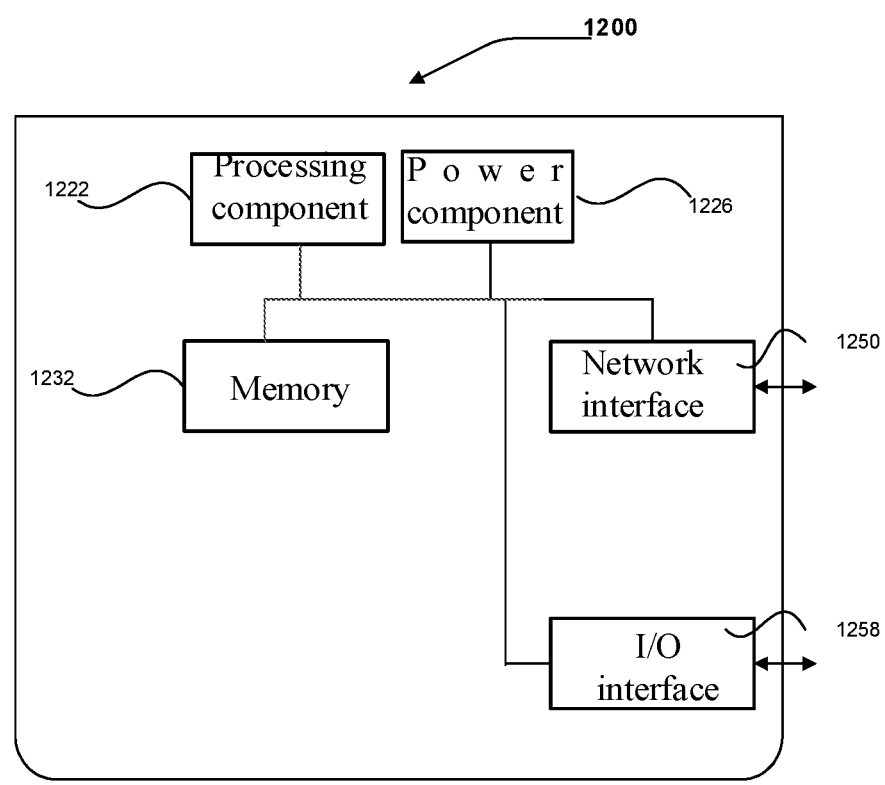
FIG. 12 is a block diagram of an apparatus for transmitting random access indication information according to an exemplary embodiment.

FIG. 12 is a block diagram of an apparatus 1200 for transmitting random access indication information according to an exemplary embodiment. For example, the apparatus 1200 may be provided as a computer. Referring to FIG. 12, the apparatus 1200 includes a processing component 1222, further including one or more processors, and a memory resource represented by a memory 1232, configured to store an instruction executable for the processing component 1222, for example, an application program. The application program stored in the memory 1232 may include one or more than one module of which each corresponds to a set of instructions. In addition, the processing component 1222 is configured to execute the instruction to execute the data synchronization method.

The apparatus 1200 may further include a power component 1226 configured to execute power management of the apparatus 1200, a wired or wireless network interface 1250 configured to connect the apparatus 1200 to a network and an I/O interface 1258. The apparatus 1200 may be operated based on an operating system stored in the memory 1232, for example, Windows Server™, Mac OS X™, Unix™, Linux™, FreeBSD™ or the like.

In an exemplary embodiment, an apparatus for transmitting random access indication information is provided, which includes:

a processor; and memory storing instructions executable by the processor, wherein processor is configured to:

generate indication information about random access, the indication information indicating that 2-step contention-based random access is supported or 4-step contention-based random access is supported; and broadcast a system message to UE, the system message including the indication information.

The processor may further be configured to carry out operations as follows.

The system message includes an indication bit configured to bear the indication information, and the indication bit is 1 bit.

The processor may further be configured to carry out operations as follows.

The system message includes the indication bit configured to bear the indication information;

when a value of the indication bit is true, the indication information indicates that 2-step contention-based random access is supported; and when the value of the indication bit is false, the indication information indicates that 4-step contention-based random access is supported;

or, when the value of the indication bit is true, the indication information indicates that 4-step contention-based random access is supported; and when the value of the indication bit is false, the indication information indicates that 2-step contention-based random access is supported;

the operation that the random access manner corresponding to the indication information is determined includes that:

when the value of the indication bit is true, it is determined that the indication information indicates that 2-step contention-based random access is supported; and when the value of the indication bit is false, it is determined that the indication information indicates that 4-step contention-based random access is supported; or when the value of the indication bit is true, it is determined that the indication information indicates that 4-step contention-based random access is supported; and when the value of the indication bit is false, it is determined that the indication information indicates that 2-step contention-based random access is supported.

The processor may further be configured to carry out operations as follows.

When the indication information indicates that 2-step contention-based random access is supported, the message system includes an indication bit; and when the indication information indicates that 4-step contention-based random access is supported, the message system defaults on the indication bit;

or when the indication information indicates that 2-step contention-based random access is supported, the message system defaults on an indication bit; and when the indication information indicates that 4-step contention-based random access is supported, the message system includes the indication bit.

The processor may further be configured to carry out operations as follows.

The indication information includes resource configuration information required when 2-step contention-based random access is supported and/or resource configuration information required when 4-step contention-based random access is supported.

The system message includes a first information unit and/or a second information unit, the first information unit is configured to bear the resource configuration information required when 2-step contention-based random access is supported, and the second information unit is configured to bear the resource configuration information required when 4-step contention-based random access is supported.

The processor may further be configured to carry out operations as follows.

The system message includes a MIB or a SIB1.

According to a computer-readable storage medium, instructions in the storage medium is executed by a processor of an apparatus to enable the apparatus to implement the method for transmitting random access indication information, the method including that:

indication information about random access is generated, the indication information indicating that 2-step contention-based random access is supported or 4-step contention-based random access is supported; and a system message is broadcast to UE, the system message including the indication information.

The instruction in the storage medium may further include that:

the system message includes an indication bit configured to bear the indication information, and the indication bit is 1 bit.

The instruction in the storage medium may further include that:

the system message includes an indication bit configured to bear the indication information;

when a value of the indication bit is true, the indication information indicates that 2-step contention-based random access is supported; and when the value of the indication bit is false, the indication information indicates that 4-step contention-based random access is supported;

or, when a value of the indication bit is true, the indication information indicates that 4-step contention-based random access is supported; and when the value of the indication bit is false, the indication information indicates that 2-step contention-based random access is supported;

the operation that the random access manner corresponding to the indication information is determined includes that:

when the value of the indication bit is true, it is determined that the indication information indicates that 2-step contention-based random access is supported; and when the value of the indication bit is false, it is determined that the indication information indicates that 4-step contention-based random access is supported; or when the value of the indication bit is true, it is determined that the indication information indicates that 4-step contention-based random access is supported; and when the value of the indication bit is false, it is determined that the indication information indicates that 2-step contention-based random access is supported.

The instruction in the storage medium may further include that:

when the indication information indicates that 2-step contention-based random access is supported, the message system includes an indication bit; and when the indication information indicates that 4-step contention-based random access is supported, the message system defaults on the indication bit;

or, when the indication information indicates that 2-step contention-based random access is supported, the message system defaults on an indication bit; and when the indication information indicates that 4-step contention-based random access is supported, the message system includes the indication bit.

The instruction in the storage medium may further include that:

the indication information includes resource configuration information required when 2-step contention-based random access is supported and/or resource configuration information required when 4-step contention-based random access is supported; and the system message includes a first information unit and/or a second information unit, the first information unit is configured to bear the resource configuration information required when 2-step contention-based random access is supported, and the second information unit is configured to bear the resource configuration information required when 4-step contention-based random access is supported.

The instruction in the storage medium may further include that:

the system message includes a MIB or a SIB1.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof

What is claimed is:

1. A method for transmitting random access indication information, implemented by a base station and comprising:

generating indication information about random access, the indication information indicating that 2-step contention-based random access is supported or 4-step contention-based random access is supported; and broadcasting a system message to User Equipment (UE), the system message comprising the indication information, wherein the indication information comprises at least one of resource configuration information required when 2-step contention-based random access is supported or resource configuration information required when 4-step contention-based random access is supported; and the system message comprises at least one of a first information unit or a second information unit, the first information unit is configured to bear the resource configuration information required when 2-step contention-based random access is supported, and the second information unit is configured to bear the resource configuration information required when 4-step contention-based random access is supported, wherein the system message comprises a System Information Block 1 (SIB 1).

2. The method of claim 1, wherein the system message comprises an indication bit configured to bear the indication information, and the indication bit is 1 bit.

3. The method of claim 1, wherein the system message comprises an indication bit configured to bear the indication information;

when a value of the indication bit is true, the indication information indicates that 2-step contention-based random access is supported; and when the value of the indication bit is false, the indication information indicates that 4-step contention-based random access is supported; or when a value of the indication bit is true, the indication information indicates that 4-step contention-based random access is supported; and when the value of the indication bit is false, the indication information indicates that 2-step contention-based random access is supported.

4. The method of claim 1, wherein when the indication information indicates that 2-step contention-based random access is supported, the message system comprises an indication bit; and when the indication information indicates that 4-step contention-based random access is supported, the message system defaults on the indication bit; or, when the indication information indicates that 2-step contention-based random access is supported, the message system defaults on an indication bit; and, when the indication information indicates that 4-step contention-based random access is supported, the message system comprises the indication bit.

5. A method for transmitting random access indication information, implemented by User Equipment (UE) and comprising:

receiving a system message broadcast by a base station, the system message comprising indication information and the indication information indicating that 2-step contention-based random access is supported or 4-step contention-based random access is supported;

recognizing the indication information from the system message; and determining a random access manner corresponding to the indication information, wherein the indication information comprises at least one of resource configuration information required when 2-step contention-based random access is supported or resource configuration information required when 4-step contention-based random access is supported;

the system message comprises at least one of a first information unit or a second information unit, the first information unit is configured to bear the resource configuration information required when 2-step contention-based random access is supported, and the second information unit is configured to bear the resource configuration information required when 4-step contention-based random access is supported;

recognizing the indication information from the system message comprises:
 parsing at least one of the first information unit or the second information unit from the system message, and recognizing the resource configuration information from at least one of the first information unit or the second information unit,
 wherein the system message comprises a System Information Block 1 (SIB 1).

6. The method of claim 5, wherein the system message comprises an indication bit configured to bear the indication information, and the indication bit is 1 bit;
 recognizing the indication information from the system message comprises:
  parsing the indication bit from the system message, and recognizing the indication information from the indication bit.

7. The method of claim 5, wherein the system message comprises an indication bit configured to bear the indication information;
 recognizing the indication information from the system message comprises:
  parsing the indication bit from the system message, and recognizing the indication information from the indication bit; and
 determining the random access manner corresponding to the indication information comprises:
  when a value of the indication bit is true, determining that the indication information indicates that 2-step contention-based random access is supported; and, when the value of the indication bit is false, determining that the indication information indicates that 4-step contention-based random access is supported; or
  when a value of the indication bit is true, determining that the indication information indicates that 4-step contention-based random access is supported; and, when the value of the indication bit is false, determining that the indication information indicates that 2-step contention-based random access is supported.

8. The method of claim 5, wherein
 when the indication information indicates that 2-step contention-based random access is supported, the message system comprises an indication bit; and when the indication information indicates that 4-step contention-based random access is supported, the message system defaults on the indication bit;
 determining the random access manner corresponding to the indication information comprises:
  when the indication bit is parsed from the system message, determining that the indication information corresponds to 2-step contention-based random access; and, when the indication bit is not parsed from the system message, determining that the indication information corresponds to 4-step contention-based random access;
 or,
 when the indication information indicates that 2-step contention-based random access is supported, the message system defaults on the indication bit; and, when the indication information indicates that 4-step contention-based random access is supported, the message system comprises the indication bit;
 determining the random access manner corresponding to the indication information comprises:
  when the indication bit is parsed from the system message, determining that the indication information corresponds to 4-step contention-based random access; and
  when the indication bit is not parsed from the system message, determining that the indication information corresponds to 2-step contention-based random access.

9. An apparatus for transmitting random access indication information, comprising:
 a processor; and
 memory storing instructions executable by the processor, wherein the processor is configured to:
 generate indication information about random access, the indication information indicating that 2-step contention-based random access is supported or 4-step contention-based random access is supported; and
 broadcast a system message to User Equipment (UE), the system message comprising the indication information,
 wherein the indication information comprises at least one of resource configuration information required when 2-step contention-based random access is supported or resource configuration information required when 4-step contention-based random access is supported; and
 the system message comprises at least one of a first information unit or a second information unit, the first information unit is configured to bear the resource configuration information required when 2-step contention-based random access is supported, and the second information unit is configured to bear the resource configuration information required when 4-step contention-based random access is supported,
 wherein the system message comprises a System Information Block 1 (SIB 1).

10. The apparatus of claim 9, wherein the system message comprises an indication bit configured to bear the indication information;
 when a value of the indication bit is true, the indication information indicates that 2-step contention-based random access is supported; and when the value of the indication bit is false, the indication information indicates that 4-step contention-based random access is supported; or
 when a value of the indication bit is true, the indication information indicates that 4-step contention-based random access is supported; and when the value of the indication bit is false, the indication information indicates that 2-step contention-based random access is supported.

11. The apparatus of claim 9, wherein
 when the indication information indicates that 2-step contention-based random access is supported, the system message comprises an indication bit; and, when the indication information indicates that 4-step contention-based random access is supported, the message system defaults on the indication bit; or, when the indication information indicates that 2-step contention-based random access is supported, the message system defaults on an indication bit; and when the indication information indicates that 4-step contention-based random access is supported, the message system comprises the indication bit.

12. An apparatus for transmitting random access indication information, implemented by User Equipment (UE) and comprising:
 a processor; and
 memory storing instructions executable by the processor, wherein the processor is configured to:
  receive a system message broadcast by a base station, the system message comprising indication information and the indication information indicating that 2-step contention-based random access is supported or 4-step contention-based random access is supported;
  recognize the indication information from the system message; and
  determine a random access manner corresponding to the indication information,
 wherein the indication information comprises at least one of resource configuration information required when 2-step contention-based random access is supported or resource configuration information required when 4-step contention-based random access is supported;
 the system message comprises at least one of a first information unit or a second information unit, the first information unit is configured to bear the resource configuration information required when 2-step contention-based random access is supported, and the second information unit is configured to bear the resource configuration information required when 4-step contention-based random access is supported;
 wherein the processor is further configured to:
  parse at least one of the first information unit or the second information unit from the system message and recognize the resource configuration information from at least one of the first information unit or the second information unit,
 wherein the system message comprises a System Information Block 1 (SIB1).

13. The apparatus of claim 12, wherein:
 the system message comprises an indication bit configured to bear the indication information, and the indication bit is 1 bit; and
 the processor is further configured to:
  parse the indication bit from the system message and recognize the indication information from the indication bit.

14. The apparatus of claim 12, wherein:
 the system message comprises an indication bit configured to bear the indication information; and
 the processor is further configured to:
  parse the indication bit from the system message and recognize the indication information from the indication bit;
 when a value of the indication bit is true, determine that the indication information indicates that 2-step contention-based random access is supported; and when the value of the indication bit is false, determine that the indication information indicates that 4-step contention-based random access is supported; and
 when the value of the indication bit is true, determine that the indication information indicates that 4-step contention-based random access is supported; and when the value of the indication bit is false, determine that the indication information indicates that 2-step contention-based random access is supported.

15. The apparatus of claim 12, wherein
 when the indication information indicates that 2-step contention-based random access is supported, the system message comprises an indication bit; and when the indication information indicates that 4-step contention-based random access is supported, the message system defaults on the indication bit; and
 the processor is further configured to:
  when the indication bit is parsed from the system message, determine that the indication information corresponds to 2-step contention-based random access, and
  when the indication bit is not parsed from the system message, determine that the indication information corresponds to 4-step contention-based random access;
or,
when the indication information indicates that 2-step contention-based random access is supported, the message system defaults on an indication bit; and when the indication information indicates that 4-step contention-based random access is supported, the message system comprises the indication bit; and
 the processor is further configured to:
  when the indication bit is parsed from the system message, determine that the indication information corresponds to 4-step contention-based random access, and
  when the indication bit is not parsed from the system message, determine that the indication information corresponds to 2-step contention-based random access.

* * * * *